United States Patent [19]

Hatanaka et al.

[11] Patent Number: 5,209,448
[45] Date of Patent: May 11, 1993

[54] FLAT DISPLAY HOLDING MECHANISM

[75] Inventors: Sunao Hatanaka; Hideaki Noda, both of Iwate, Japan

[73] Assignee: Alps Electric Co., Ltd., Tokyo, Japan

[21] Appl. No.: 622,675

[22] Filed: Dec. 5, 1990

[30] Foreign Application Priority Data

Dec. 29, 1989 [JP] Japan .................. 1-151342[U]

[51] Int. Cl.$^5$ ............................................. F16M 13/00
[52] U.S. Cl. ................................. 248/455; 248/719; 248/286; 248/298
[58] Field of Search ............... 248/455, 454, 456, 917, 248/919–923, 298, 286

[56] References Cited

U.S. PATENT DOCUMENTS

| | | | |
|---|---|---|---|
| 4,494,720 | 1/1985 | Gregory et al. | 248/971 X |
| 4,960,256 | 10/1990 | Chihara et al. | 248/917 X |
| 5,085,394 | 7/1992 | Torii | 248/919 |

FOREIGN PATENT DOCUMENTS 2223875A 8/1989 United Kingdom .

*Primary Examiner*—Alvin C. Chin-Shue
*Attorney, Agent, or Firm*—Guy W. Shoup; David W. Heid

[57] ABSTRACT

The present invention relates to a flat display holding mechanism, which comprises a guide portion provided in the main body of an apparatus such as a computer and a word processor for rotatably supporting the flat display on the main body through a link and also for guiding, when the flat display is opened, the lower portion of the flat display toward the front of the main body, and a retaining mechanism provided at a portion which moves when the flat display is opened for retaining the flat display in any desired position. With such arrangement, a display portion with a larger screen can be positioned closer to the keyboard and the flat display can be retained in any desired tilted position so that an enhanced view of the screen can be obtained.

4 Claims, 6 Drawing Sheets

FLAT DISPLAY HOLDING MECHANISM

BACKGROUND OF THE INVENTION (1) Field of the Invention

The present invention relates to a portable input/output apparatus using a flat display fabricated in a flat plate form for use in an input/output apparatus for such apparatus as a computer and a word processor and more particularly to a flat display holding mechanism for holding the flat display on the main body.

(2) Description of the Prior Art

In the above described input/output apparatuses for computers and word processors, there are those of portable type, such as of so-called lap-top type and handheld type, wherein a flat display made in a flat plate form is rotatably held on the main body, which is also made in a flat plate form with a keyboard provided thereon.

First, a conventional example of such type of flat display holding mechanisms for use in input/output apparatuss will be described below with reference to the accompanying drawings.

FIGS. 8A, 8B, and 8C show an example of conventional flat display holding mechanisms. An input/output apparatus 1 has a main body 2 shaped in a rectangular and flat plate form, and at the rear of the main body 2, there is formed a rectangular parallelepiped protruded portion 3. On the top surface of the front portion of the main body 2, there is disposed a keyboard 4.

In front of the protruded portion 3 of the main body 2, there is provided a support shaft 5 extended in the horizontal direction, and a flat display 6 shaped in a flat plate form is rotatably supported on the support shaft 5. On the flat display 6, there is provided a display portion 7, which is structured of a liquid crystal panel, an EL panel, or the like, and adapted to look down in a closed state where the flat display 6 closes the keyboard 4 as shown in FIG. 8A. The flat display 6 is so shaped as to form a rectangular parallelepiped, together with the main body 2, in the closed state as shown in FIG. 8A.

With the described arrangement, by having the apparatus not in use put into a closed state, where the flat display 6 is turned down thereby closing the keyboard 4 as shown in FIG. 8A, the apparatus becomes handy to carry. When it is used, the flat display 6 is rotated from the closed state shown in FIG. 8A in a clockwise direction round the support shaft 5, whereby the flat display 6 is held in a tilted state with the back side of the flat display 6 supported on the protruded portion 3 of the main body 2. Then, the keyboard 4 becomes opened and the display portion 7 of the flat display 6 looks up at an angle, so that the operator is enabled to conduct some operations by operating keys on the keyboard 4 while looking at the display portion 7.

FIGS. 9A, 9B, and 9C show another example of conventional flat display holding mechanisms. This example is different in design from that in FIGS. 8A, 8B, and 8C in that the protruded portion 3A at the rear of the main body 2 is extended forward to the position around the center of the depth of the main body 2, and, correspondingly, the size of the flat display 6A, including the display portion 7A, measured in the direction of the depth of the main body 2 is made smaller than that of the flat display 6 in FIGS. 8A, 8B, and 8C. Since other design features are the same as those of the example of FIGS. 8A, 8B, and 8C, description thereof will be omitted.

The apparatus structured as shown in FIGS. 9A, 9B, and 9C can be handled similarly to that shown in FIGS. 8A, 8B, and 8C.

However, the types shown in FIGS. 8A, 8B, and 8C and FIGS. 9A, 9B, and 9C each have the following disadvantage.

In the case where the type shown in FIGS. 8A, 8B, and 8C is used, the flat display 6 is greatly separated from the keyboard 4 as shown in FIG. 8B and FIG. 8C and, hence, the display portion 7 of the flat display 6 goes away from the operator and becomes difficult to see. Further, the flat display 6 sticks out rearward from the rear end of the main body 2 as indicated by the length a in FIG. 8C and, hence, the flat display 6 is prevented from opening wide if there is an object present behind the main body 2, thereby making it possible that the input/output apparatus 1 becomes unable to be used.

In the case where the type shown in FIGS. 9A, 9B, and 9C is used, different from the case of FIGS. 8A, 8B, and 8C, the flat display 6A is not separated so much from the keyboard 4 and the flat display 6A does not stick out rearward from the rear end of the main body 2. However, the surface area of the flat display 6A becomes smaller than that of the flat display 6 in FIGS. 8A, 8B, and 8C, and, naturally, the area of the display portion 7A becomes correspondingly smaller than that of the display portion 7 in FIGS. 8A, 8B, and 8C. Consequently, the display on the display portion 7A becomes smaller and difficult to see.

In addition, since the tilted attitude of the flat display 6 and 6A in FIG. 8 and FIG. 9 in the opened state for use is fixed and the tilted attitude is unable to be changed even when the display portion 7 and 7A become difficult to see on account of the ambient lighting and the like. The incapability of adjustments of the tilted attitude sometimes causes a problem in practical use.

SUMMARY OF THE INVENTION

It is an object of the present invention to provide a flat display holding mechanism in which the above mentioned problems in the conventional types are solved and has such features that, when a flat display of a larger surface is used, the flat display is positioned closer to the keyboard so that the display portion can be seen well, the flat display when in use can be set so as, at least, not to stick out greatly, from the rear end of the main body, and the flat display when in use can be held in any desired tilted position.

Another object of the present invention is to provide a flat display holding mechanism for rotatably holding a flat display on the main body, in which the flat display is rotatably held on the main body through a link, a guide portion is provided in the main body for guiding the lower portion of the flat display toward the front of the main body when the flat display is opened, and a retaining mechanism is provided at a portion which moves when the flat display is opened, for retaining the flat display in any position.

According to the present invention with described arrangement, even if a flat display of a larger surface area is provided, it, when the apparatus is used, is moved toward the front of the main body along the guide portion in the main body. Since the flat display can thus be brought closer to the keyboard, the largesized display portion comes to be viewed in a shorter distance and seen well. Further, the flat display, when in use, is prevented from greatly sticking out from the rear end of the main body and, in addition, the flat display can be retained in any desired tilted position by means of the retaining mechanism.

BRIEF DESCRIPTION OF THE DRAWINGS

FIG. 1 to FIG. 6 are drawings showing an embodiment of a flat display holding mechanism according to the present invention, of which FIG. 2 is an enlarged perspective view showing a state in service, FIG. 3 is an exploded perspective view showing details of guide grooves and leg portions, FIG. 4 is a sectional view of a portion of a retaining mechanism, FIG. 5 is a sectional view taken along line V—V of FIG. 4, FIG. 6 is similar drawing to FIG. 5 showing another example of the guide groove.

DESCRIPTION OF PREFERRED EMBODIMENTS

Figure 8A:
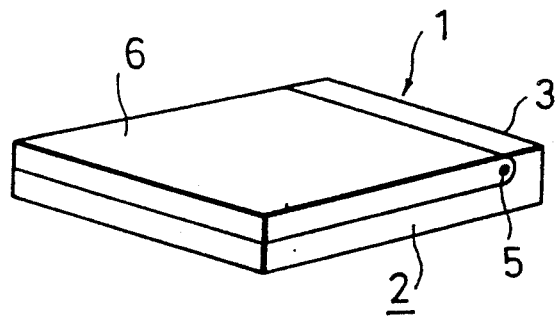
FIGS. 8A, 8B, and 8C and FIGS. 9A, 9B, and 9C are drawings similar to FIGS. 1A, 1B, and 1C showing conventional flat display holding mechanisms.
Figure 8B:
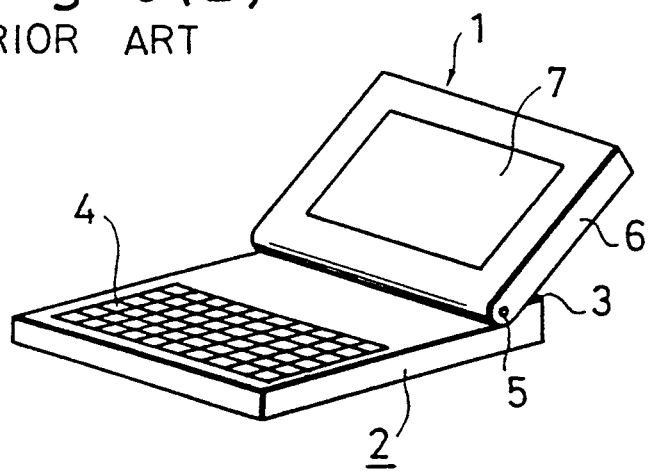
Figure 8C:
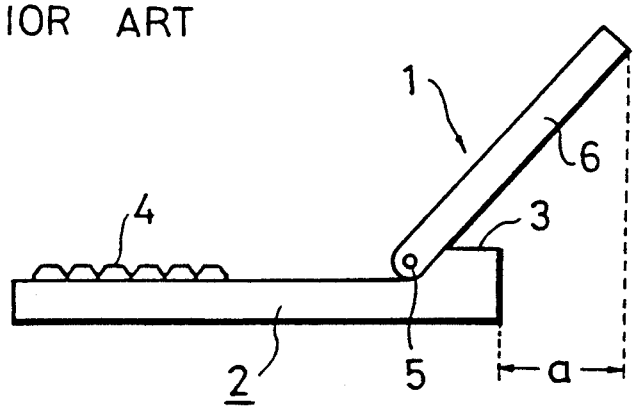
Figure 9A:
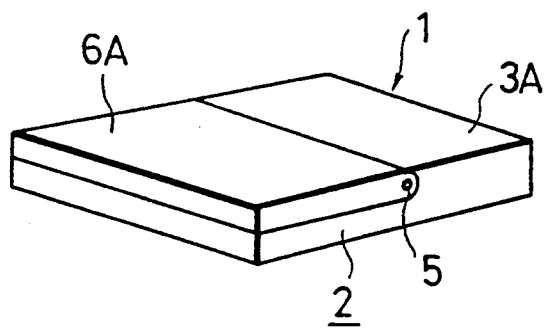
Figure 9B:
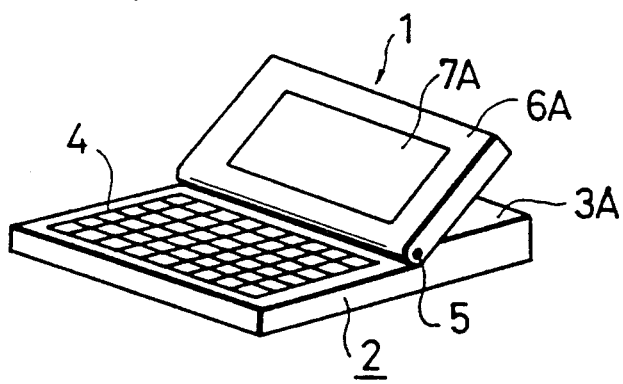
Figure 9C:
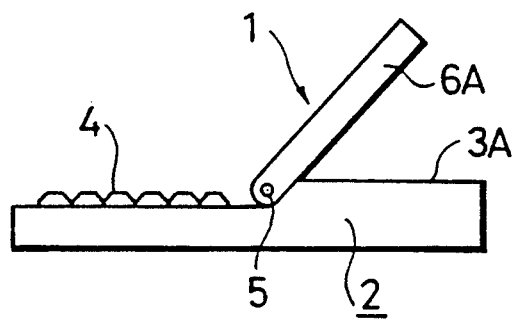

The present invention will be described below with reference to an embodiment shown in the accompanying drawings. Denoting parts of the same structure as those of the above described conventional examples by corresponding reference numerals, description thereof will be omitted FIGS. 1A, 1B, and 1C to FIG. 6 are drawings showing an input/output apparatus 1 to which the flat display holding mechanism according to the present invention is applied. At the rear of the main body 2 of the input/output apparatus 1, there is provided thereon a protruded portion 3B virtually of the same form as the above described protruded portion 3 of FIGS. 8A, 8B, and 8C. In the front of the protruded portion 3B virtually at the center of its width, there is provided a plate-formed link 9 supported on a support shaft 8 for rotation round it, the support shaft extending in the longitudinal direction of the protruded portion 3B.

In the surface of the main body 2 between the protruded portion 3B and the keyboard 4, there are provided, as shown, in detail, in FIG. 3 to FIG. 6, a pair of guide grooves 10, 10, as an example of guide portions extended in the fore-and-aft direction of the main body 2, running in parallel spaced apart on the left side and the right side of the main body 2. Each guide groove 10 is formed of a longitudinal groove 11 and a lateral groove 12 arranged to have substantially an L-shaped cross section, the lateral groove 12 being bent inward, i.e., toward the counterpart, at the bottom of the longitudinal groove 11.

The flat display 6B, shaped in the form capable of covering virtually the whole area of the portion of the main body 2 except the protruded portion 3B, has a display portion 7B with a large screen. on the back side of the flat display 6B, somewhat lower than the center of its height, there is provided another support shaft 13 extended in parallel with the above mentioned support shaft 8, and the end of the link 9 is pivotally attached to the flat display 6B through the support shaft 13. Therefore, the flat display 6B is rotatably supported on the link 9.

Figure 5:
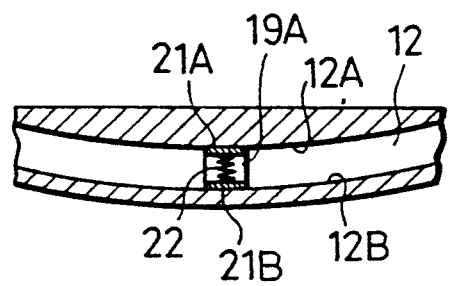
Figure 6:
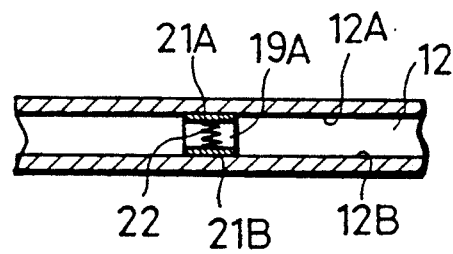

At the position in the middle of the lateral direction of the bottom end of the flat display 6B, there is provided a bracket 14 hanging down from the flat display 6B. At the left-hand side and the right-hand side of the bottom end of the bracket 14, there are provided a pair of legs 15, 15 hanging down from the bracket. Each leg 15 has its end doglegged in the forward direction so that the flat display 6B may rotate through a sufficiently large angle between the closed position and the used position. Each leg 15 is provided at its end with a retaining mechanism 16 which is guided along the lateral groove 12 of the guide groove 10 and retains the flat display 6B in any desired tilted position. In each retaining mechanism 16, a friction block 19 is fixed to a boss portion 17 provided at the end of the leg 15, with a set pin 20 projected from a side face of the main body 19A of the friction block 19 fitted into a set hole 18 bored in the boss portion 17 in the lateral direction. The main body 19a of the friction block 19 has a cross section substantially in the shape of the letter U opening toward the interior of the lateral groove 12 and formed in the size capable of moving along the lateral groove 12. Between an upper piece 21A and a lower piece 21B of the main body 19A, there is inserted a compression spring 22, whereby the upper face of the upper piece 21A and the lower face of the lower piece 21B are resiliently pressed against the upper and lower faces 12A and 12B of the lateral groove 12, respectively, so that the flat display 6B may be retained in any tilted position by virtue of the frictional force. The lateral groove 12 along which the friction block 19 moves may be curved upward in the vertical direction of the main body 2 as shown in FIG. 5, or it may be flat as shown in FIG. 6. In order to obtain a proper coefficient of friction between the lateral groove 12 and the upper piece 21A as well as the lower piece 21B, at least one of the upper face 12A and the lower face 12B of the lateral groove 12 may be provided by the surface of a resin material, coated with a suitable material, or may have a thin sheet material pasted thereon.

The operation of the present embodiment structured as above will be described below.

The flat display 6B is pivotally attached to the link 9 which is pivotally attached to the protruded portion 3B of the main body 2, and both the legs 15, 15 of the flat display 6B are arranged such that the friction blocks 19 of the retaining mechanisms 16 thereof are fitted in the guide grooves 10, 10 formed in the surface of the main body 2. Since each leg 15 is doglegged, the flat display 6B is able to fully cover the top of the main body 2 with each leg 15 positioned at the end of the guide groove 10 on the side of the protruded portion 3B (FIG. 1A).

Figure 1A:
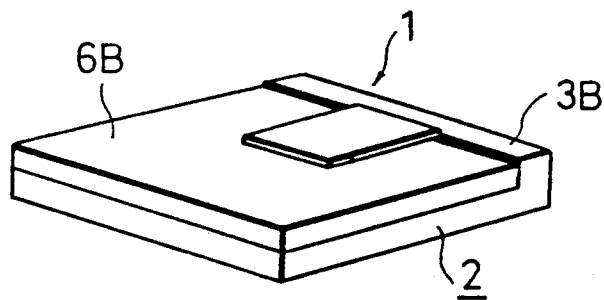
FIG. 1A is a perspective view showing a closed state.
Figure 1B:
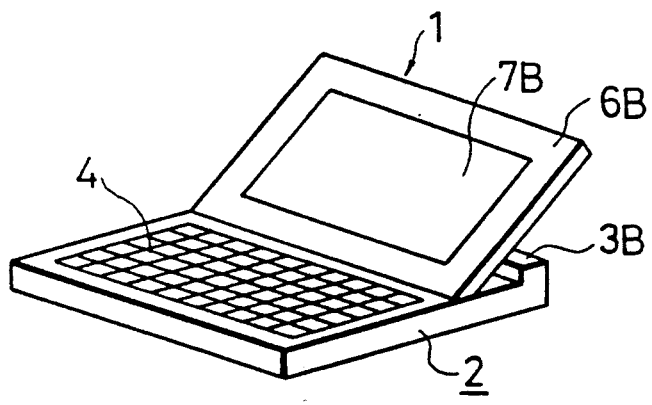
FIG. 1B is a perspective view showing a used state.
Figure 1C:
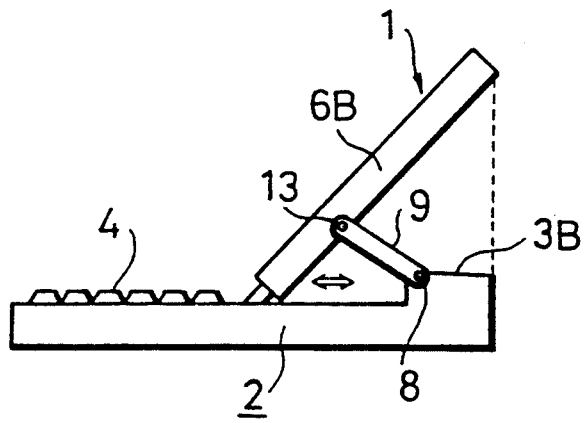
FIG. 1C is a side view of FIG. 1B.
Figure 2:
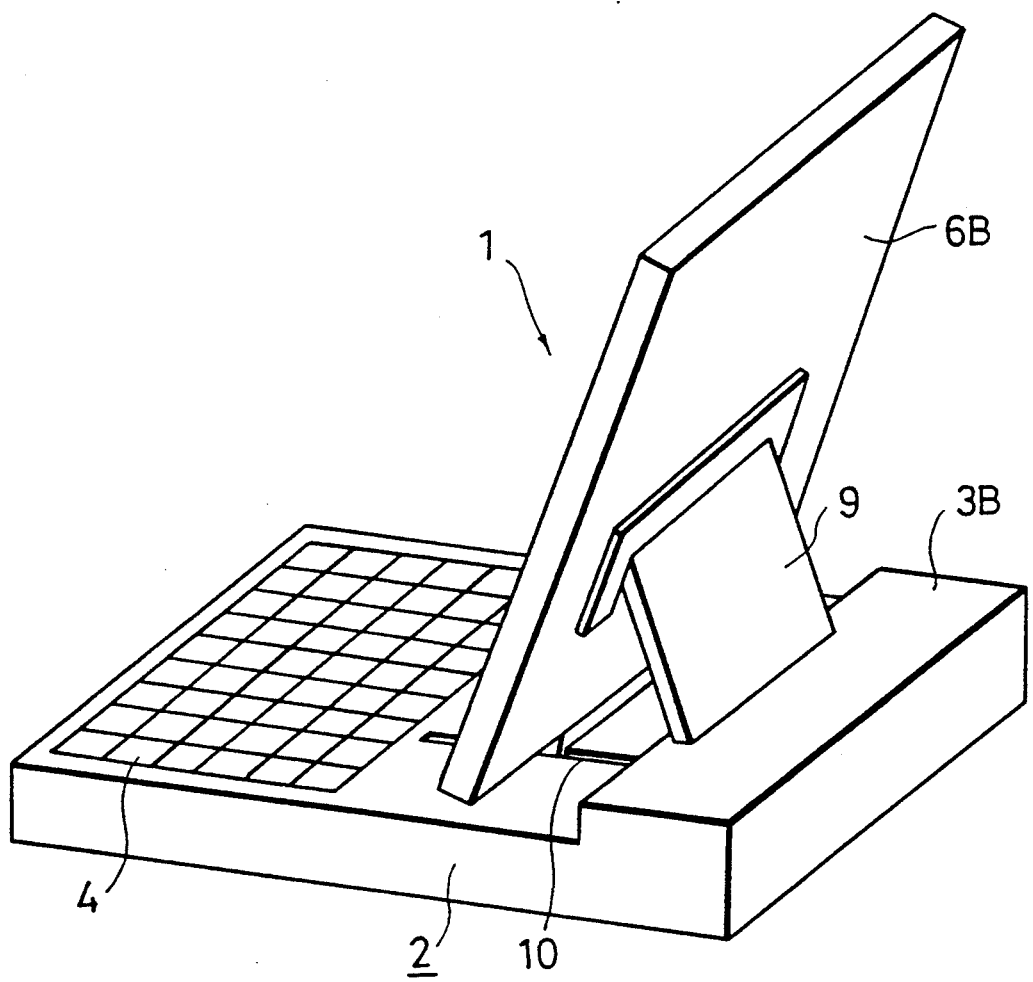
Figure 3:
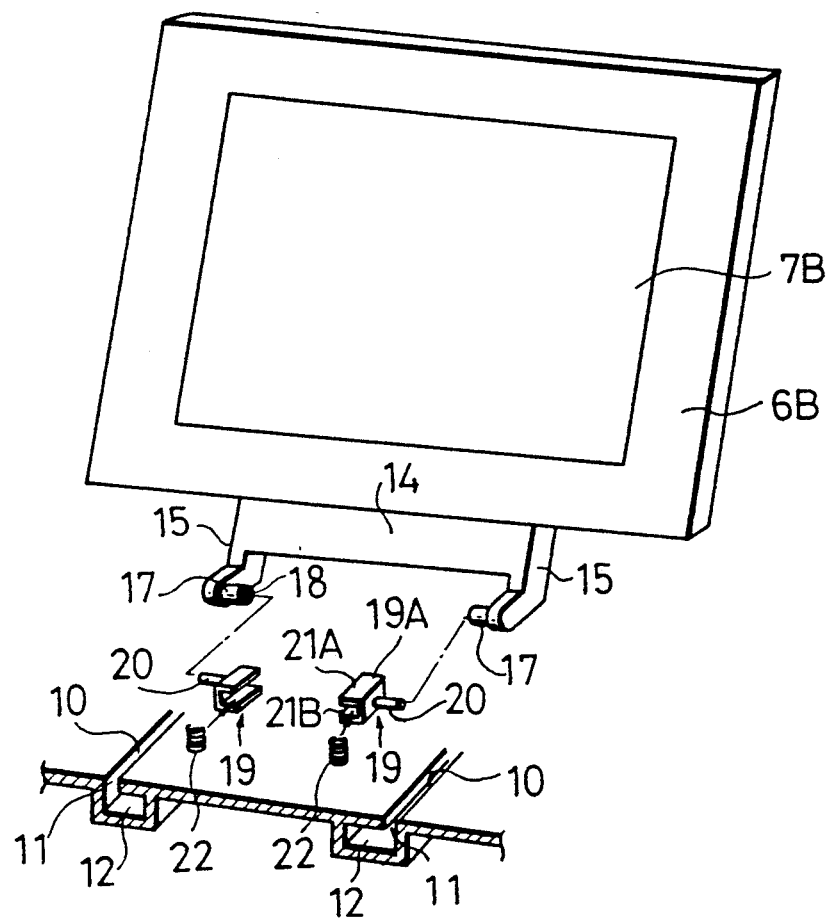
Figure 4:
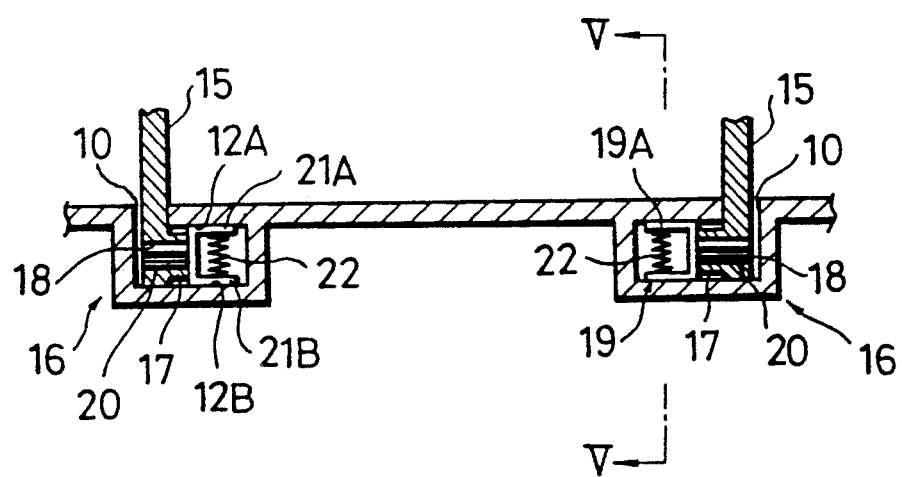

When using the apparatus, the flat display 6B is rotated in a clockwise direction from the closed position shown in FIG. 1A. Then, each friction block 19 substantially stays at the end of each guide groove 10 until the flat display 6B assumes an upright position allowing, practically, only the flat display 6B to rotate. However, when the flat display 6B tends to turn down toward the protruded portion 3B, a component force is produced to cause each leg 15 and each friction block 19 to move toward the front of the main body 2 along the longitudinal groove 11 and the lateral groove 12 of the guide groove 10 and, as a result, the upper piece 21A and the lower piece 21B of the main body 19A of the friction block 19 at the end of each leg 15 are allowed to slide overcoming the friction force between the same and the lateral groove 12 due to the compression force of the compression spring 22. The limit of the movement of the lower portion of the flat display 6B is the point where each friction block 19 reaches the end of each guide groove 10 toward the keyboard 4 as shown in FIG. 1C, and in the position shown therein, the flat display 6B is closest to the keyboard 4. Since, in the present embodiment, the upper piece 21a and the lower piece 21B of the friction block 19 of the retaining mechanisms 16 are resiliently pressed against the upper and lower faces 12A and 12B of the lateral groove 12, respectively, by the compression spring 22, the friction block 19 can, by virtue of the friction force between the upper and lower pieces 21A and 21B and the lateral groove 12, retain the flat display 6B in a tilted state in any desired position in the longitudinal direction of the lateral groove 12. Therefore, it becomes possible to avoid such a tilted state of the display portion 7B where it becomes difficult to see due to reflection of external light therefrom and to hold the flat display 6B in a tilted state best for use.

In such a service condition, since the flat display 6B having the display portion 7B with a larger screen is positioned closer to the keyboard 4, the display portion 7B becomes easy to see, and since the flat display 6B does not greatly stick out from the rear end of the main body 2, the apparatus can be used without being interfered with by other objects.

For returning the apparatus, to the closed state, from its used state, for example, from the state as shown in FIG. 1C, the flat display 6B may be rotated in a counterclockwise direction, and then, each leg 15 moves within the guide groove 10 toward the protruded portion 3B, and thereby, the state as shown in FIG. 1A is attained.

According to the present embodiment as described above, it becomes possible to bring the lower portion of the flat display 6B closer to the keyboard 4 thereby making the display easy to see, to hold the flat display 6B in any tilted position making the apparatus easy to use, and, in addition, to prevent the flat display 6B from greatly sticking out of the rear end of the main body 2, which facilitates the use of the apparatus very much. Since the apparatus becomes a flat plate form when it is closed, the apparatus is handy to carry.

Figure 7:
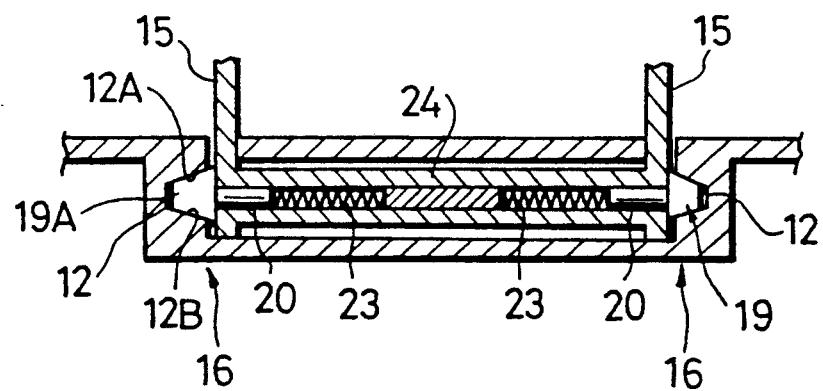
FIG. 7 is a similar drawing to FIG. 4 showing another embodiment of the retaining mechanism.

FIG. 7 shows another embodiment of the retaining mechanism 16. In this embodiment, each guide groove 10 is formed of a longitudinal groove 11 and a lateral groove 12, which is bent outward and designed such that the opening between the upper and lower faces 12A and 12B becomes narrower toward the outer end. Further, the retaining mechanism 16 provided at the end of the leg 15 is designed such that the main body 19A of the friction block 19 is shaped in an wedge form with the same taper angle as that of the upper and lower faces 12A and 12B of the lateral groove 12, the set pin 20 projecting from the side face of the main body 19A is inserted, from outside, into the set hole 18 bored in a connecting cylinder 24 for the legs 15, 15 to be set therein, and the set pin 20 is outwardly pushed by a compression spring 23 so that the upper and lower faces of the main body 19A of the friction block 19 makes a frictional contact with the upper and lower faces 12A and 12B of the lateral groove 12 at a suitable coefficient of friction.

In this embodiment also, the main body 19A of the friction block 19 of the retaining mechanism 16 has its upper and lower faces in frictional engagement with the upper and lower faces 12a and 12B of the lateral groove 12 and it is made possible to hold the flat display 6B in any desired tilted position.

Although, in the above describe embodiments, it is arranged such that the flat display 6B is held in any desired tilted position by virtue of the frictional force provided by the retaining mechanism 16, such arrangements as to provide a plurality of click mechanisms for holding the flat display 6B in any desired position, to provide restraining mechanism for the portions of both of the support shafts 8 and 13 of the link 9 for holding the flat display 6B in any desired position, or other similar mechanisms of various kinds may be provided, instead, on the portions which move when the flat display 6B is brought into a used state, The present invention is not limited to the above described embodiments but various modifications may be made according to the need.

According to the present invention, as described in the foregoing, such practical effects can be obtained that a flat display with a larger surface area can be brought into a position closer to the keyboard when the apparatus is used so that the display portion becomes easy to see, that the flat display when in use can be prevented, at least, from sticking out greatly from the rear end of the main body, and that the flat display when in use can be held in any desired tilted position.

What is claimed is:

1. A flat display holding mechanism for holding a flat display on a main body such that said flat display may be opened or closed, comprising:
   a link for pivotably supporting said flat display on said main body;
   first and second legs formed at a lower part of said flat display;
   first and second guide grooves having a substantially L-shaped cross-section provided in said main body in proximity to said lower part of said flat display for guiding said first and second legs, respectively, such that, when said flat display is opened, said lower part of said flat display moves toward a front part of said main body; and
   first and second retaining mechanisms connected to said first and second legs, respectively, for retaining said flat display in any desired position.

2. A flat display holding mechanism according to claim 1, wherein each of said first and second retaining mechanisms comprises:
   a friction member that contacts a surface of a corresponding guide groove; and
   a resilient member for resiliently pushing said friction member against said surface of said corresponding guide groove.

3. A flat display holding mechanism according to claim 1, wherein each of said first and second guide grooves has a curved cross-section perpendicular to said L-shaped cross-section.

4. A flat display holding mechanism according to claim 2, wherein said groove portion is shaped in a straight form.

* * * * *